United States Patent [19]

Fulford

[11] Patent Number: 5,361,552

[45] Date of Patent: * Nov. 8, 1994

[54] WOODEN DOOR ASSEMBLY AND DOOR JAMB ASSEMBLY HAVING AN INSULATIVE FOAM CORE

[76] Inventor: Mark Fulford, P.O. Box 0245, Issaquah, Wash. 98027

[*] Notice: The portion of the term of this patent subsequent to Jun. 15, 2010 has been disclaimed.

[21] Appl. No.: 74,028

[22] Filed: Jun. 4, 1993

Related U.S. Application Data

[62] Division of Ser. No. 893,760, Jun. 5, 1992, Pat. No. 5,218,807.

[51] Int. Cl.5 ............................................. E06B 3/70
[52] U.S. Cl. ........................... 52/455; 52/309.4; 49/501
[58] Field of Search ............ 52/455, 785, 809, 811, 52/805, 309.4, 309.9, 311, 313, 730; 49/501, 503

[56] References Cited

U.S. PATENT DOCUMENTS

| | | | |
|---|---|---|---|
| 2,334,113 | 11/1943 | Malarkey | 20/35 |
| 2,791,809 | 5/1957 | Lincoln | 52/785 |
| 3,286,424 | 11/1966 | Weyant | 52/291 |
| 3,334,464 | 8/1967 | Charles | 52/620 |
| 3,345,780 | 10/1967 | McGhee | 49/504 |
| 3,969,868 | 7/1976 | Bainter et al. | 52/622 |
| 3,987,588 | 10/1976 | Imperial et al. | 49/501 |
| 4,034,511 | 7/1977 | Bursk | 49/488 |
| 4,064,655 | 12/1977 | Weyant | 49/501 |
| 4,114,319 | 9/1978 | Governale | 49/488 |
| 4,147,004 | 4/1979 | Day et al. | 52/309.9 |
| 4,152,876 | 5/1979 | Seely | 52/455 |
| 4,282,687 | 8/1981 | Teleskivi | 49/503 |
| 4,294,055 | 10/1981 | Andresen | 52/795 |
| 4,630,420 | 12/1986 | Hagemeyer | 52/313 |
| 4,726,148 | 2/1988 | Tix | 49/453 |
| 4,876,838 | 10/1989 | Hagemeyer | 52/455 |
| 4,888,918 | 12/1989 | Green et al. | 49/501 |
| 5,020,292 | 6/1991 | Strom et al. | 52/309.9 |
| 5,022,206 | 6/1991 | Schield et al. | 52/455 |

Primary Examiner—Carl D. Friedman
Assistant Examiner—Creighton Smith
Attorney, Agent, or Firm—James Richard Vance

[57] ABSTRACT

Door assembly and method of manufacture thereof having a wooden composite subframe assembly and an insulative foam core that are encapsulated within an exterior veneer or solid wood stile and/or rail of finish wood material. Wooden door jamb assembly having a wooden composite subframe, an insulative foam door jamb core, and an exterior veneer or solid wood laminate of finish wood material.

42 Claims, 6 Drawing Sheets

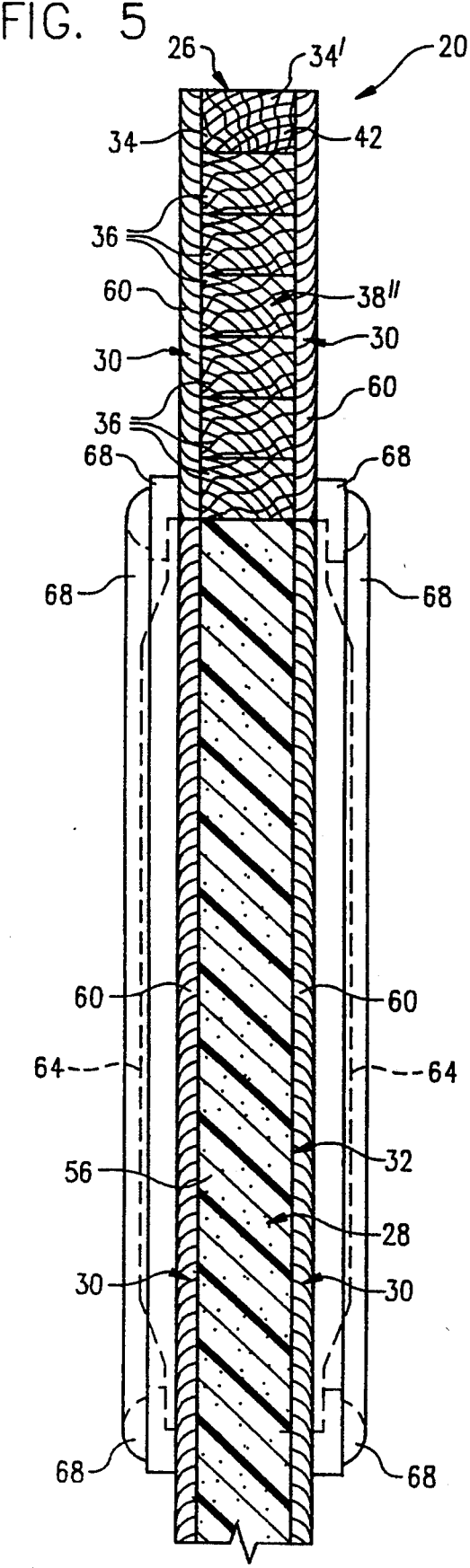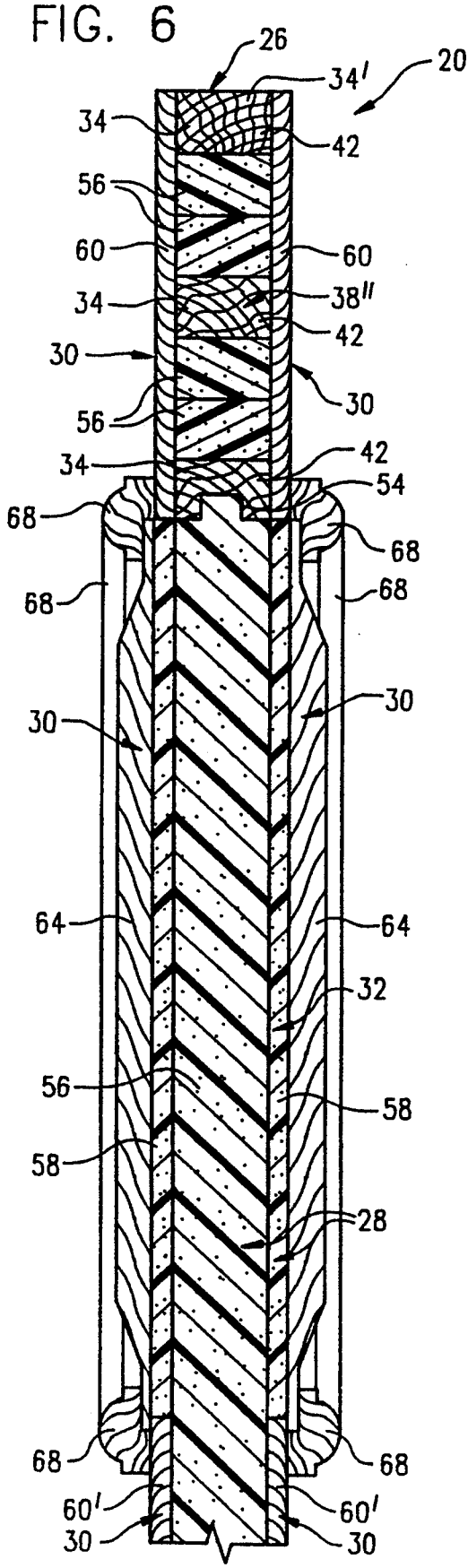

WOODEN DOOR ASSEMBLY AND DOOR JAMB ASSEMBLY HAVING AN INSULATIVE FOAM CORE

CROSS REFERENCE TO RELATED APPLICATION

This is a divisional application of a commonly owned, copending patent application, titled WOODEN DOOR ASSEMBLY AND DOOR JAMB ASSEMBLY HAVING AN INSULATIVE FOAM CORE, Ser. No. 07/893,760, which was filed in the United States Patent and Trademark Office on Jun. 5, 1992, and is now U.S. Pat. No. 5,218,807.

COPYRIGHT NOTICE

© Copyright 1992, James R. Vance. All rights reserved.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

TECHNICAL FIELD

This invention relates to apparatus and processes for manufacturing a raised panel, wooden door assembly and related door jamb having an insulative foam core.

BACKGROUND ART

Heretofore, exterior and interior residential doors have been manufactured with various structures. For example, such doors may be manufactured from solid wood planks. Alternatively, the planks may be milled to form solid wood stiles, rails, and panels that are fitted and secured to each other.

The production of solid and milled wood doors requires the stockpiling and use of a large quantity of very expensive, high-quality wood. With the depletion of the world's old-growth forests, such wood is becoming prohibitively expensive and difficult to acquire and store. In addition, such doors do not provide an effective insulating barrier.

Heavy sheets of thick glass may also be used to either create the door or to replace one or more milled panels therein. The use or placement of glass within a door significantly decreases the energy efficiency of the door.

Some doors have a composite exterior plastic or metal skin which is overlaid upon and applied to solid wood stiles and rails. Such doors have a hollow interior core and are not very energy efficient.

Another variation of door structure is to encapsulate a thin sheet of batten fiberglass or foam insulating material within the otherwise hollow core. Solid wood stiles and rails are again used about the perimeter or periphery of the door. The fiberglass or foam insulating material is juxtaposed between a thin outer and inner exterior plastic or metal skin.

If a raised panel design is desired, a compression press is used to indent both the outer skin and the insulating material to form the desired design. Although this manufacturing process produces a door having admirable energy conserving capabilities, the end product typically has a thin, stretched plastic or metal surface which is not aesthetically appealing.

Such laminated, thin skinned doors are significantly different from a traditional stainable wooden door. The perimeter of such doors reveals either sharp plastic edges or folded metal edges. Such composite doors do not have the appearance, sound, or weight that is expected of a high-quality wooden door.

The following disclosures relate to various types of known door structures and methods for manufacture thereof: Weyant (U.S. Pat. No. 3,286,424; issued Nov. 22, 1966); Charles (U.S. Pat. No. 3,334,464; issued Aug. 8, 1967); Bainter et al. (U.S. Pat. No. 3,969,868; issued Jul. 20, 1976); Imperial et al. (U.S. Pat. No. 3,987,588; issued Oct. 26, 1976); Bursk (U.S. Pat. No. 4,034,511; issued Jul. 12, 1977); Weyant (U.S. Pat. No. 4,064,655; issued Dec. 27, 1977); Governale (U.S. Pat. No. 4,114,319; issued Sep. 19, 1978); Day et al. (U.S. Pat. No. 4,147,004; issued Apr. 3, 1979); Seely (U.S. Pat. No. 4,152,876; issued May 8, 1979); Teleskivi (U.S. Pat. No. 4,282,687; issued Aug. 11, 1981); Andresen (U.S. Pat. No. 4,294,055; issued Oct. 13, 1981); Green et al. (U.S. Pat. No. 4,888,918; issued Dec. 26, 1989); and Strom et al. (U.S. Pat. No. 5,020,292; issued Jun. 4, 1991).

The inventor believes that the cited disclosures taken alone or in combination neither anticipate nor render obvious the present invention. The foregoing citation does not constitute an admission that such disclosures are relevant or material to the present claims. Rather, the disclosures relate only to the general field of the invention and are cited as constituting the closest art of which the inventor is aware.

DISCLOSURE OF INVENTION

The present invention is designed to overcome the previously stated difficulties and disadvantages. Furthermore, the invention provides an extremely effective energy efficient wooden door assembly and wooden door jamb assembly, including the method of manufacture thereof. The present invention allows lengths of less expensive wood and inexpensive insulating material to be used in the construction of both the door and door jamb. The amount of expensive, high-quality wood that is required to construct the door and door jamb is significantly reduced. The resulting door and door jamb assemblies, however, have the appearance of a very high-quality, traditional, flush or paneled door and related door jamb having a solid wood construction.

The present invention furthermore provides apparatus and processes to manufacture a composite wooden door assembly and door jamb assembly having high-quality raised door panels. The interior core of the door is filled with easily manipulated sheets of foam insulating material. The amount and volume of insulating material used within the door and door jamb assemblies is maximized. The door assembly is also easily adjusted to manufacture custom sized doors without requiring substantial retooling and physical modification of manufacturing equipment.

More particularly, the present invention is specifically designed for use within the residential home construction and remodeling industries to increase the energy efficiency of residential dwellings. For example, the apparatus and processes taught herein may be used to manufacture door assemblies having no raised panels, or having two, four, six, eight, or any other number, of raised panels as commonly installed within residential homes. Alternatively, door structures using this invention may be enlarged and strengthened to create garage doors having the aforesaid beneficial features.

The present invention accomplishes the foregoing objectives by using a particularly designed wooden door assembly that is attachable to a framed door opening within a residential home. The wooden door assembly generally comprises: a wooden composite subframe stile and rail assembly; an insulative foam core; and an exterior veneered or solid wood stile, rail, and raised panel assembly.

The wooden composite subframe stile and rail assembly is formed by joining and securing a plurality of spaced, elongated members to a plurality of spacers. The spacers are generally juxtaposed between adjacent elongated members. The spacers may be secured to the elongated members by any appropriate means. However, in the preferred embodiment of the invention, the spacers are secured to the elongated members by means of ultrasonic or radio frequency welding. The space between opposed or adjacent subframe stiles and opposed or adjacent subframe rails defines an enclosure.

The subframe assembly comprises at least a pair of subframe stiles and a pair of subframe rails. The subframe stiles preferably each have at least two generally vertical elongated members that are held in spaced relationship to each other by the spacers. The subframe rails preferably each have at least two generally horizontal elongated members that are also held in spaced relationship to each other by similar spacers.

To increase the efficiency in manufacturing the present invention, each of the subframe rails is generally identical and therefore interchangeable. Similarly, each of the subframe stiles should be generally identical and therefore interchangeable. Consequently, the cost for tooling is limited to only two or three primary elements for the subframe assembly.

In addition to the foregoing subframe stiles and rails, the subframe rails may further include at least one kick or bottom rail assembly. The kick or bottom rail assembly preferably comprises at least two generally horizontal elongated members that are held in spaced relationship to each other by spacers similar to the spacers mentioned above. The kick or bottom rail assembly is positioned to define a lower boundary of the enclosure near a lower edge of the wooden door assembly.

The subframe rails are joined to the subframe stiles by any appropriate means. However, the inventor prefers to use a mortise and tenon joint because of its strength and durability.

Because most of the subframe elements will be hidden beneath the exterior veneered or solid wood stile, rail, and raised panel assembly, it is preferable that the subframe stiles and rails that are exposed about the periphery or peripheral portion of the wooden door assembly be manufactured of a finish wood material. The elements which generally comprise the remaining portions of the subframe stiles and rails may be manufactured from less expensive or blemished wood.

The insulative foam core is positioned within the enclosure and is secured to the subframe stile and rail assembly. A wide variety of insulative foam core materials can be used. Alternatively, a composite of two or more different insulative foam core materials and/or heat reflective sheets or films may be used.

To maximize the ability of the wooden door assembly to insulate and reduce heat transfer, insulative foam core material could also be positioned between the spaced elongated members in both the subframe stiles and in the subframe rails.

In the preferred embodiment, the insulative foam core comprises a base core and a spacer core. The base core is placed within the enclosure between the subframe stiles and rails. The base core may simply be secured in place between the subframe stiles and rails. Alternatively, the innermost elongated members or elements of the subframe stiles and rails may have a mortise or channel that receives and secures at least a portion of the outer edges or periphery of the base core.

Once the base core is properly placed within the enclosure, the exterior surface and interior surface of the door may be planed and/or sanded.

The veneered or solid wood stile, rail, and raised panel assembly is then attached or laminated to the exposed exterior and interior surfaces of the door. Since the veneered or solid wood stile, rail, and raised panel assembly is exposed to close observation, such elements are made from a high-quality, finish wood material that allows for staining, if desired, or for painting. At the present time, the inventor prefers that the exterior stile, rail, and raised panel assembly be made of thin solid wood. Alternatively, the exterior stile, rail, and raised panel assembly may comprise a series of opposing grained, laminated wooden sheets that interact to prevent splitting of the veneered wood.

The aforementioned insulative spacer core is placed between the exterior wooden stiles and rails. The spacer core is juxtaposed against and secured to the insulative base core to raise the level of the insulative foam core such that it is generally flush with the exterior-most surfaces of the exterior wood stiles and rails. This allows for the sanding process to smooth both the spacer core of the insulative foam core and the exterior wooden stiles and rails with a single pass.

The veneered or solid wood panels are then juxtaposed against and secured to exterior surfaces of the smooth, flush spacer core.

Since the exterior wooden stile, rail, and raised panel assembly is laminated to the outer surfaces of the subframe assembly and insulative foam core, such exterior assembly encapsulates the insulative foam core within the enclosure, protecting it from weather and abrasion.

To accommodate proper placement and faster manufacturing of the door, the exterior wooden rails may further comprise a lap or tenon that engages and properly aligns the exterior wooden rails to adjacent, abutting, exterior wooden stiles. For example, the exterior wooden stiles may be attached to adjacent exterior wooden rails by means of a scarf, lap, or mortise and tenon joint.

To further embellish and strengthen the composite wooden exterior door assembly, an ornamental molding may be used to secure the exterior raised panels to the exterior stiles and rails.

The present invention further contemplates the use of a wooden composite door jamb. The composite door jamb has a plurality of wooden blocks that are secured together to form a subframe door jamb. The subframe door jamb is secured within a framed door opening of a building to hold the composite wooden door assembly.

The subframe door jamb defines a door jamb enclosure that is capable of containing an insulative foam core. The composite door jamb further comprises exterior finish wood veneer or solid wood facia members that can be stained and/or painted.

In addition to the apparatus taught herein, the invention comprises a method for manufacturing the above-described composite wooden door assembly. The method for the manufacture of the door assembly includes the steps of: (a) juxtaposing spacers between spaced, elongated members; (b) securing the spacers to the elongated members to form a wooden composite subframe stile and rail assembly as described above; (c) placing insulative foam core within the enclosure between opposed stiles and opposed rails; (d) securing the insulative foam core to the subframe stile and rail assembly; and (d) laminating an exterior veneer or solid wood stile, rail, and raised panel assembly to the subframe stile and rail assembly and to the insulative foam core. The ornamental molding may also be secured to the raised panel and to the exterior assembly.

The resulting apparatus and method of manufacture thereof allows for the construction of what outwardly appears to be a solid wooden door and door jamb. The resulting door and door jamb, however, have an extremely high capacity to insulate a home against loss of heat and/or of cooling. The resulting composite wooden door and door jamb are extremely strong and can be manufactured at a greatly reduced cost than heretofore available. The invention also allows such a door and door jamb to be manufactured by using blemished and less expensive wood within its subframe assembly. In addition, the invention requires the use of a significantly reduced amount of expensive hardwood and old-growth timber in the construction of its exterior assembly.

These and other objects and advantages of the present invention will become more readily apparent upon reading the following disclosure and referring to the attached drawings.

BRIEF DESCRIPTION OF DRAWINGS

FIG. 5 is a partial, enlarged, cross-sectional, plan view of the door structure of the present invention as seen along a plane defined by line 5—5 in FIG. 1.

FIG. 6 is a partial, enlarged, cross-sectional, plan view of the door structure of the present invention as seen along a plane defined by line 6—6 in FIG. 1.

Figure 1:
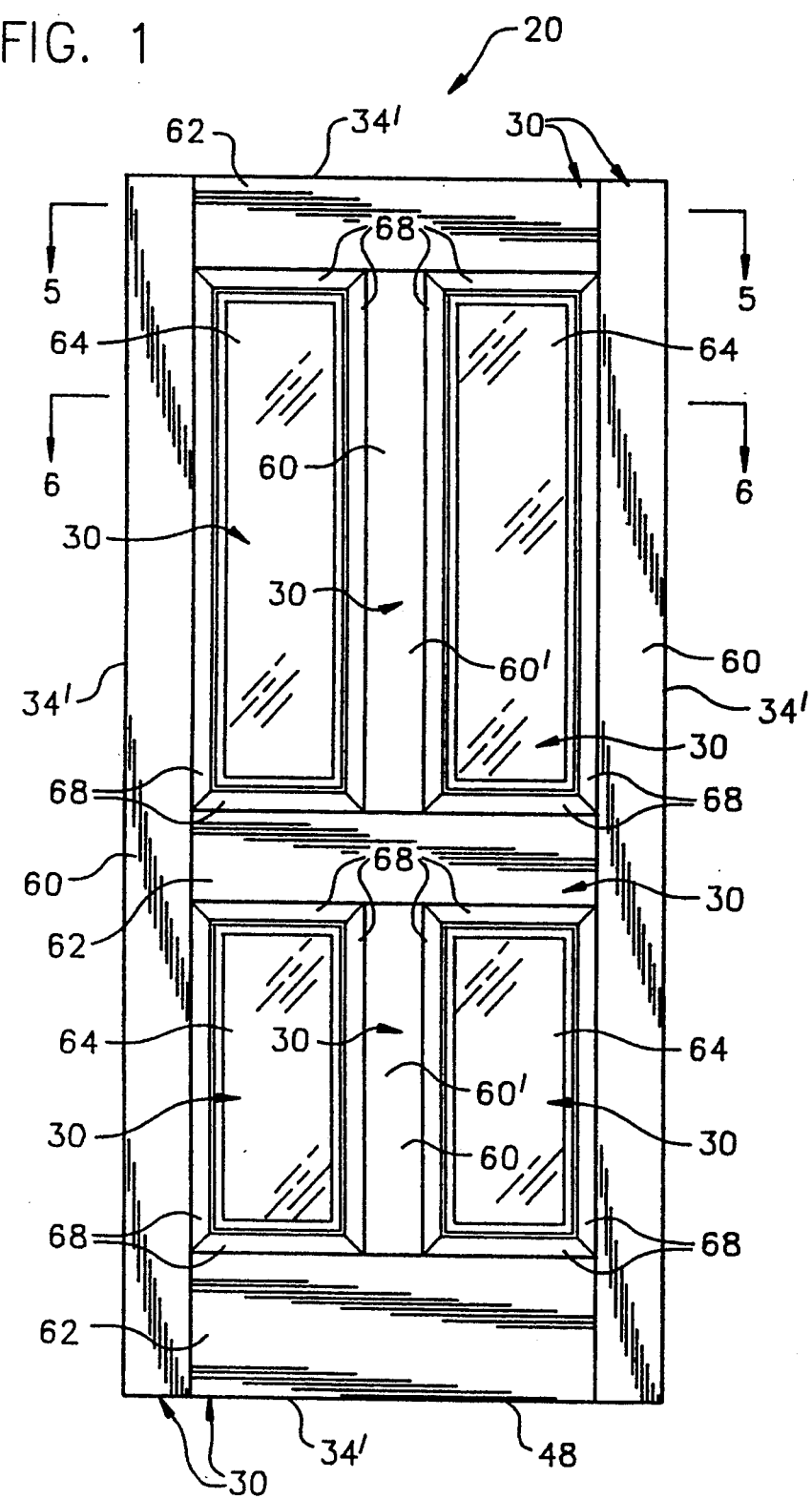
FIG. 1 is a front-elevational view of a composite wooden door made in accordance with the present invention.

One should understand that the drawings are not necessarily to scale and the elements are sometimes illustrated by graphic symbols, phantom lines, diagrammatic representations, and fragmentary views. In certain instances, the inventor may have omitted details which are not necessary for an understanding of the present invention or which render other details difficult to perceive.

BEST MODE FOR CARRYING OUT THE INVENTION

Referring to the drawings, wherein like numerals indicate like parts, wooden door assembly 20 and wooden door jamb assembly 22 of the present invention are a new door and door jamb system which incorporate the structural and insulating qualities and benefits of insulative foam with the strength, durability, stainability, paintability, texture, sound, appearance, and ambiance of a traditional solid wood door or of a traditional stile, rail, and multiple panel wooden door and associated door jamb.

Door jamb assembly 22 is intended to be attached to a conventional framed door opening within a residential home or commercial building (not shown). The manner of attachment may be accomplished by any appropriate means. For example, door jamb assembly 22 may be secured to adjacent studs that form the door opening with nails, bolts, screws 24, or the like. The heads of the nails, bolts, or screws 24 may be hidden from view by their being countersunk and plugs (not shown) being used to seal the opening to the countersunk bore hole. Door jamb assembly 22 will be discussed in depth further below.

Door assembly 20 is secured to door jamb assembly 22 by any appropriate means such as by using a plurality of traditional hinges (not shown).

Door assembly 20 generally comprises: a wooden composite subframe stile and rail assembly 26; an insulative foam core 28; and an exterior veneered or solid wood stile, rail, and raised panel assembly 30.

Subframe assembly 26 provides various important features to the invention. For example, subframe assembly 26 imparts rigidity and structural integrity to door assembly 20 and gives traditionally weak joints added strength for durability and increased longevity. Subframe 26 provides means for attaching hinges, door knobs, dead bolt locks, kick plates, and similar hardware to door assembly 20. Subframe assembly 26 also defines the edge boundaries of an enclosure 32.

It is important to note that insulative foam core 28 has substantially improved capability to resist the passage of heat therethrough than comparable thicknesses of solid wood. Consequently, to increase the energy efficiency of door assembly 20, it is important to maximize the use of insulative foam material therein without unduly compromising the strength and other advantageous features inherent within a solid wood door.

After substantial experimentation and testing, the inventor has discovered that by using a subframe assembly 26 as illustrated, comprising a plurality of spaced, elongated members 34 and a plurality of spacers 36 secured thereto, the strength of door assembly 20 is not necessarily compromised. Spacers 36 are generally juxtaposed between adjacent elongated members 34 to achieve the aforesaid spacing.

Spacers 36 may be secured to elongated members 34 by any appropriate means which allow such elements to act in unison. In the preferred embodiment, spacers 36 are secured to elongated members 34 by means of ultrasonic or radio frequency welding.

Figure 2:
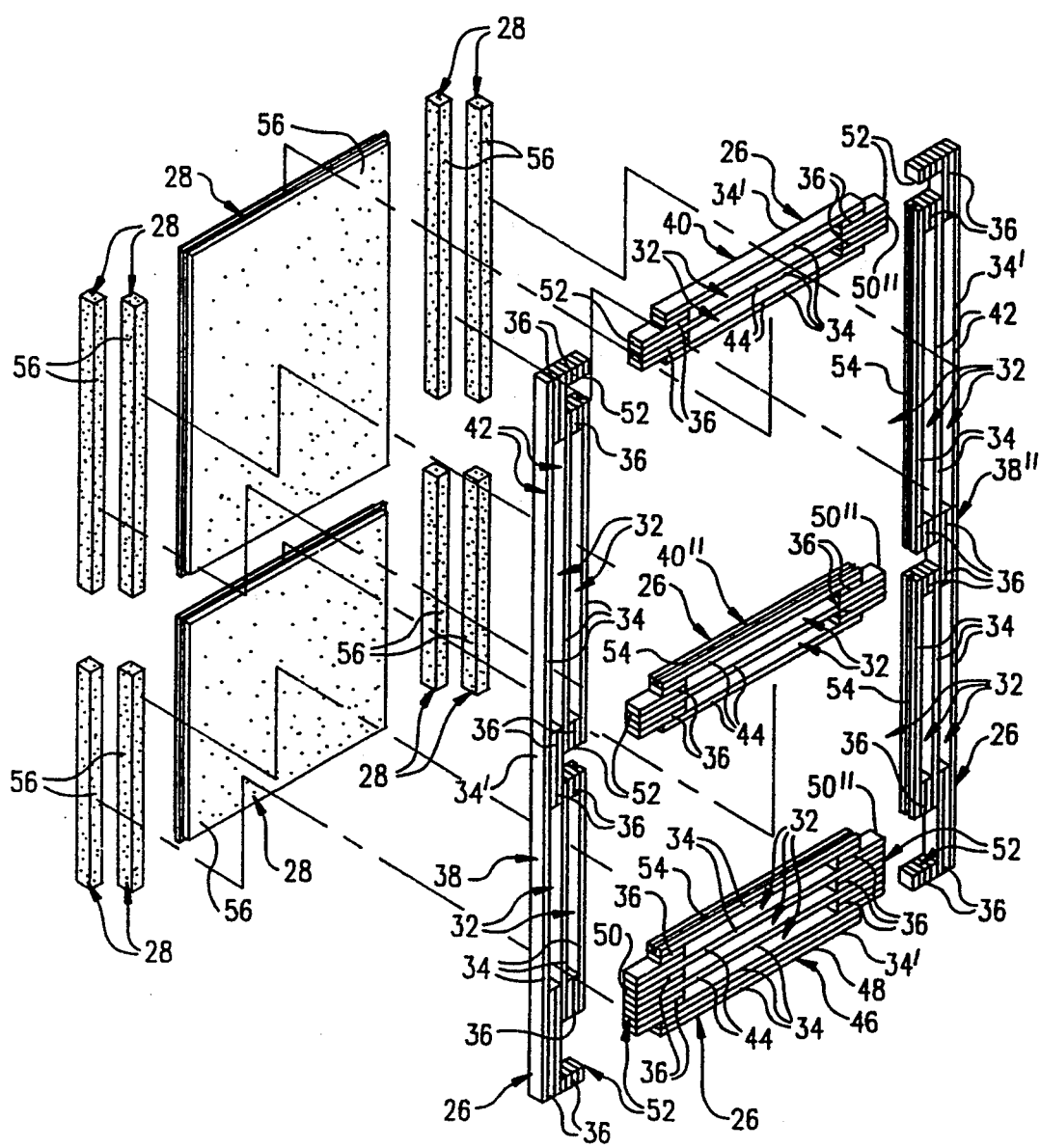
FIG. 2 is an exploded, isometric view of the composite wooden subframe stiles, subframe rails, and the insulative foam base core which combine to form the subframe assembly of the present invention.
Figure 3:
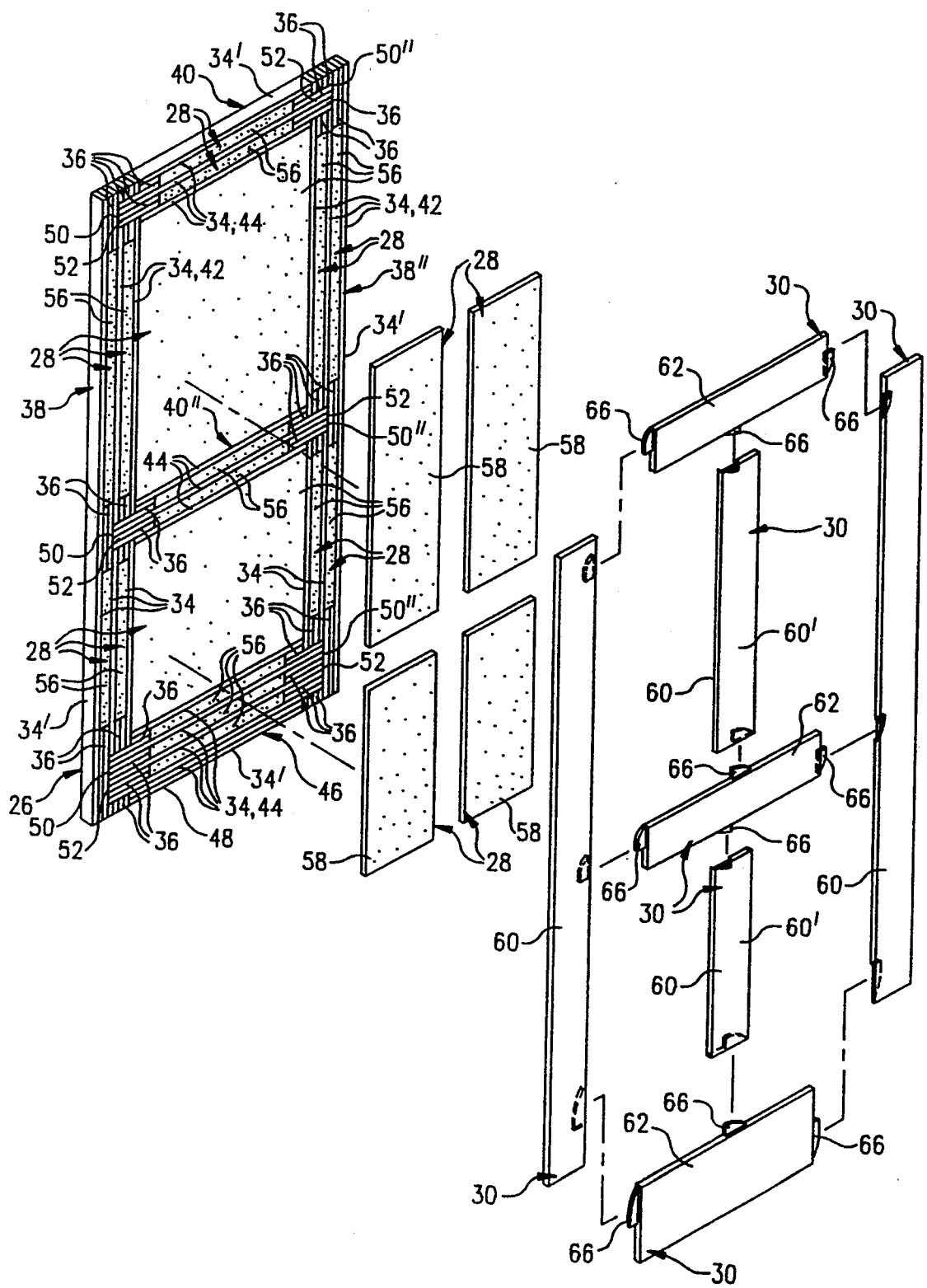
FIG. 3 is an exploded, isometric view of the insulative spacer core and of the exterior veneer or solid wood stile and rail assembly as they would be applied to the united subframe stile and rail assembly and base core.
Figure 4:
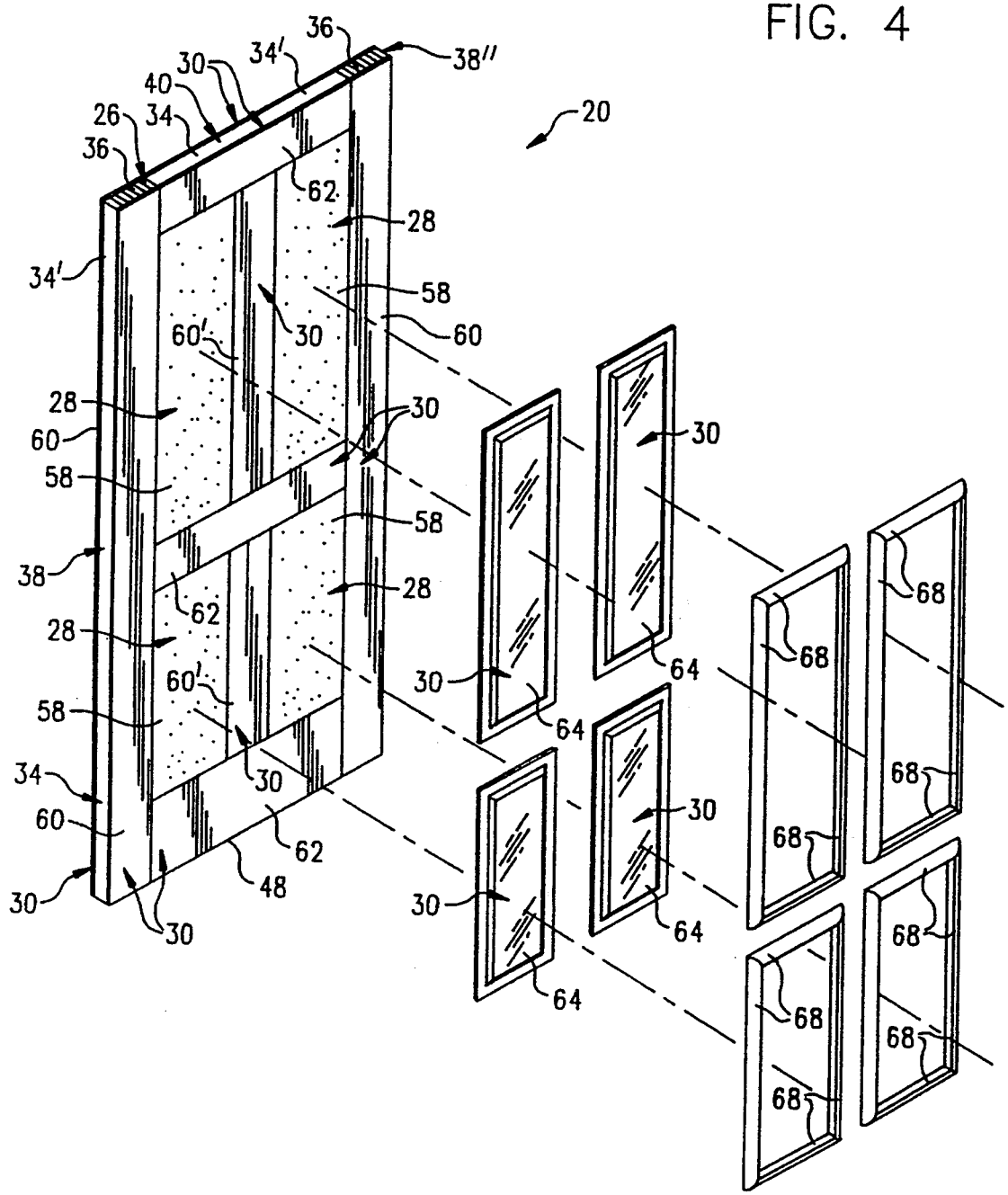
FIG. 4 is an exploded, isometric view of the raised panel assembly and molding, illustrating how such elements would be applied to the underlying spacer core and exterior stile and rail assembly of the door structure.

As best seen in FIGS. 2 and 3, subframe assembly 26 preferably comprises at least a pair of subframe stiles 38 and 38" and at least a pair of subframe rails 40 and 40".

Each of subframe stiles 38 and 38" has at least two generally vertically oriented elongated members 42. Elongated members 42 are held in spaced relationship to each other by spacers 36. Similarly, each of subframe rails 40 and 40" has at least two generally horizontally oriented elongated members 44. Elongated members 44 are also held in spaced relationship to each other by spacers 36.

In the preferred embodiment, at least two of subframe stiles 38 and 38" are generally identical and therefore interchangeable. Similarly, at least two of subframe rails 40 and 40" are generally identical and therefore interchangeable. More than two subframe stiles 38 and 38" or subframe rails 40 and 40" may be used if needed or desired.

Subframe assembly 26 may further comprise at least one kick or bottom rail assembly 46 having at least two generally horizontally oriented elongated members 44 held in spaced relationship to each other by spacers 36. Kick or bottom rail assembly 46 is positioned near a lower edge 48 of door assembly 20. As illustrated, kick or bottom rail assembly 46 preferably has a greater width, thickness, or height than subframe rails 40 and 40".

Respective ends 50 and 50" of subframe rails 40 and 40" and of kick or bottom rail assembly 46 are secured or joined to subframe stiles 38 or 38" by any appropriate means. To increase the strength of such connections, it is preferable that a mortise and tenon joint 52 be used. Other types of joints or use of additional hardware can be used to make such a connection or joint if needed or desired.

Due to the fact that most of subframe assembly 26 will be hidden beneath or behind exterior assembly 30, the various components of subframe assembly 26 may be manufactured from inexpensive wood. In addition, since subframe assembly 26 is constructed of segments of elongated members 34 and spacers 36 that have varying lengths, wooden segments that are bowed or bent may be segmented and used therein without having an adverse impact on door assembly 20. Consequently, inexpensive, blemished, bowed, and/or bent segments of wood may be used to construct subframe assembly 26. In sharp contrast, heretofore, only the finest quality of wood had to be used to manufacture a door having a similar quality of appearance.

Since the edges of subframe assembly 26 will be seen, it is preferred that the outermost edges of the subframe assembly 26 comprise high-quality wood material. To achieve this end, one or more elongated members 34' are manufactured of finish wood material. Elongated members 34' are positioned about an outer periphery or edge portion of wooden door assembly 20, and particularly on subframe stiles 38 and 38". If the top and/or bottom of door assembly 20 will be seen, or if simply desired, one or more elongated members 34' which are positioned about an outer periphery or edge portion of subframe rails 40 and 40" may also be manufactured of finish wood material.

To achieve the unique insulative qualities of the present invention, one or more sheets of insulative foam core 28 are placed within enclosure 32 and are sandwiched or juxtaposed between respective and generally identical sides of exterior assembly 30. As best seen in FIGS. 2, 3, 5, and 6, insulative foam core 28 is positioned within enclosure 32 and is secured to subframe assembly 26. To maximize the insulative characteristics of the door assembly 20, segments of insulative foam core 28 may also be placed between each spaced elongated member 34 and 34' in subframe stiles 38 and 38", in subframe rails 40 and 40", and in kick or bottom rail assembly 46.

To strengthen the connection between insulative foam core 28 and subframe assembly 26, one or more elongated members 34 may have a dado or channel 54 provided therein into which an edge of the sheet of insulative foam core 28 is inserted and retained. Channel 54 may have a sufficient width to accept the entrance of the entire width of insulative foam core 28. Such a structure reduces the amount of machining that has to be performed on the sheet of insulative foam core 28 and maximizes the amount of insulative foam core 28 used. Alternatively, one or more edges of insulative foam core 28 may be provided with an outwardly extending tongue that is received by an appropriately sized groove or channel 54.

In the preferred embodiment, insulative foam core 28 comprises a base core 56 and a spacer core 58. Base core 56 is placed within enclosure 32 and is secured to subframe assembly 26. The width of base core 56 is approximately equal to the width of subframe assembly 26. Consequently, a single pass through a sanding machine will smooth both face sides of subframe assembly 26 and base core 56.

Once the veneered or solid wood stiles and rails of the exterior assembly 30 are secured to subframe assembly 26, spacer core 58 is juxtaposed against and secured to base core 56. As a result, spacer core 58 raises insulative foam core 28 to a level that is generally flush with an exterior or facing surface of exterior assembly 30. Consequently, a single pass through a sanding machine will smooth both face sides of exterior assembly 30 and spacer core 58.

Insulative foam core 28 may be manufactured of or comprise sheets of resilient polystyrene plastic sold under the trademark STYROFOAM, or may be manufactured of any other suitable material having enhanced insulative properties. The sheet of insulative foam core 28 preferably has a final thickness of about ½ to 4 or more inches.

The door structures heretofore known often allowed a vandal to simply kick out one or more raised panels that are held in place by strips of molding. The resulting hole allowed the vandal to gain access to the interior side of a locked door. This disadvantage is virtually overcome by the present invention.

Insulative foam core 28 of the present invention imparts increased structural integrity to door assembly 20. For example, the resilient insulative foam core 28 absorbs most localized impacts made against door assembly 20 and distributes the forces of such impacts over a relatively large area. Consequently, localized impacts do not permit the punching through of any overlying raised panel. Due to the flexing and shock absorbing features of the present invention, the forces exerted against the hinges and catch-plate are also minimized during such impact.

Veneered or solid wood panels of finish wood may be laminated to the smooth facial surfaces of door assembly 20. Such panels may comprise a pair of generally identical sheets of finish material that are adhered or otherwise secured to subframe assembly 26 and insulative foam core 28. In other words, to construct a flush style door, exterior assembly 30 comprises respective sheets of a finish-grade plywood, one side of which has a finish or hardwood veneer. The perimeter or sides and ends of the panel are provided with standard edging therein, with the insulative foam core 28 therebetween. The resulting product is a door assembly 20 having a flush panel surface on both outer surfaces thereof. The flush style door assembly 20, however, has the insulative properties described above.

Alternatively, if a paneled effect having wooden stiles and rails positioned about the periphery of the face of door assembly 20 is desired, thin layers of either veneered or solid wood can be laminated directly onto the underlying subframe assembly 26 and insulative foam core 28. Similarly, thin raised panels can be appropriately adhered or laminated to door assembly 20 between the thin stiles and rails.

For example, as best seen in FIGS. 3, 4, 5, and 6, exterior assembly 30 may comprise a plurality of exterior veneered or solid wood elements. Exterior assembly 30 may comprise an exterior veneered or solid wood stile 60, rail 62, and raised panel 64. Stiles 60 represent traditional solid wood vertical stiles. Rails 62 represent traditional solid wood horizontal rails. Stile 60, rail 62, and raised panel 64 are laminated or otherwise secured to the outer surfaces of the underlying subframe assembly 26 and to insulative foam core 28. Stile 60, rail 62, and raised panel 64 are sized and appropriately juxtaposed against one another to encapsulate and hide the underlying insulative foam core 28 within enclosure 32.

Since the present invention is specifically designed to produce a door assembly 20 having a general appearance similar to that of a door having a solid wood construction, it is important that the exterior exposed surfaces or face of exterior assembly 30 comprise finish wood material that preferably can be stained or painted as desired. More specifically, it is important that the exterior stiles 60, rails 62, and raised panels 64 be manufactured from solid or veneered wood having a finish wood exterior surface. If such elements are manufactured from a laminated wood having an exterior finish wood veneer, the respective cross grains of the laminated wood prevent the finish veneer from splitting.

As seen in FIG. 3, the exterior veneer or solid wood rails 62 may further comprise a lap or tenon 66 which engages adjacent exterior veneer or solid wood stiles 60. Similarly, stiles 60 and/or innermost stile 60' may be provided with a lap or tenon 66 that engages adjacent rails 62. Rather than using a lap or tenon 66, a scarf or mortise and tenon joint may be used to connect stiles 60 and 60' to rails 62. The segments of veneered or solid wood that define exterior assembly 30 preferably are manufactured from material having a thickness of about ⅛ to 3/16 or more of an inch.

The combined thickness of subframe assembly 26, insulative foam core 28, and exterior assembly 30 preferably should be between 1 to 3 inches. The inventor prefers that such thickness be either 1¾ or 2¾ inches to fit a traditional door jamb. Consequently, the thickness of door assembly 20 manufactured using the process of the present invention can be generally equivalent to the thickness of a door manufactured by a traditional process. In other words, door assembly 20 of the present invention will fit into a standard door frame, without any need for alterations. If desired, however, thinner or thicker door assemblies 20 could be manufactured using the principles taught herein.

Thin, raised panels 64 are appropriately laminated or adhered to door assembly 20 between stiles 60 and rails 62.

Segments of picture frame or other ornamental molding 68 can then be secured to door assembly 20 around the periphery of raised panels 64. Molding 68 not only secures panels 64 to exterior stiles 60 and rails 62, molding 68 also frames and accentuates the design and aesthetic appearance of raised panels 64. The resulting product is an insulated door assembly 20 having two, four, six, eight, or more panels that appears to be made of solid wood.

Figure 7:
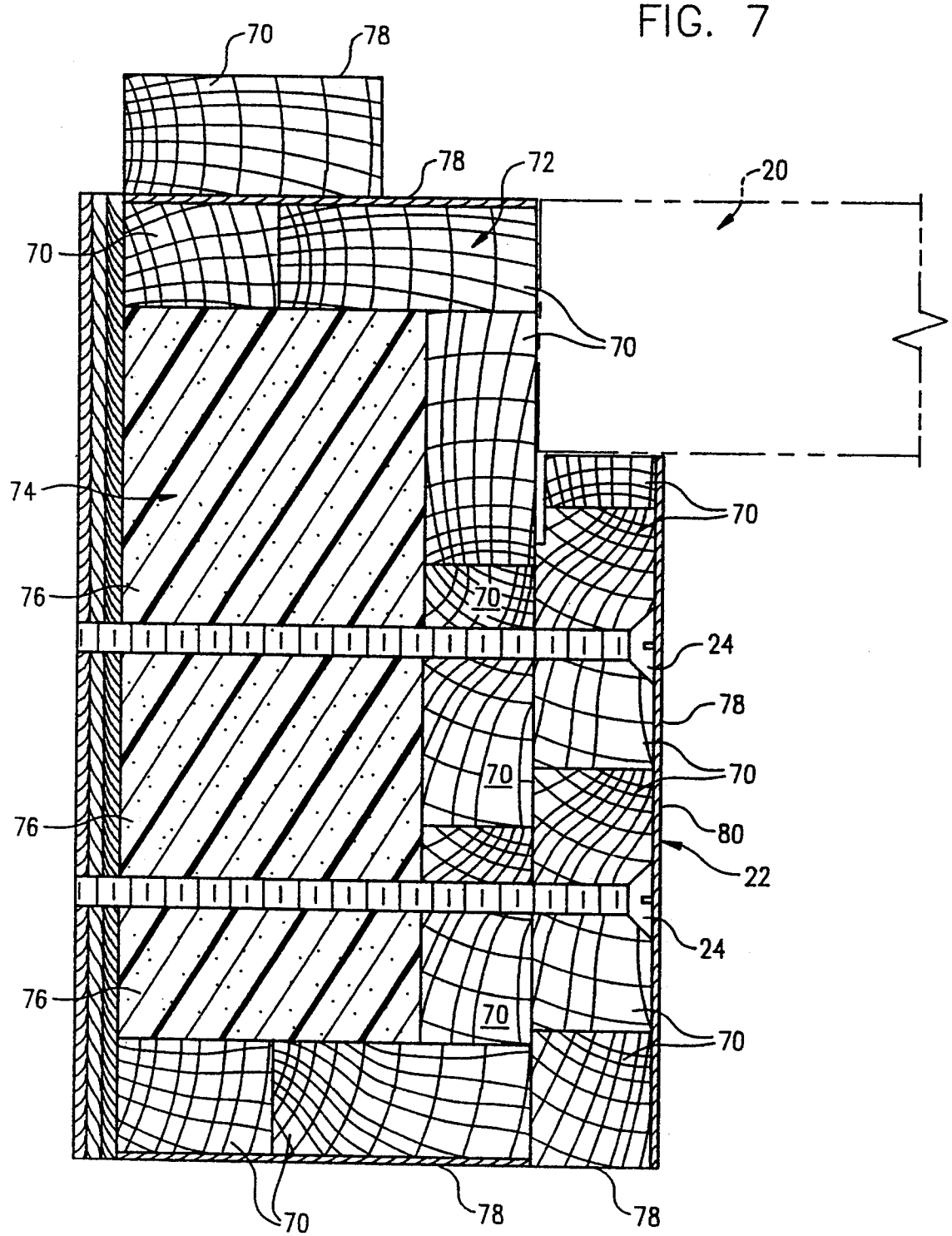
FIG. 7 is a partial, enlarged, cross-sectional, plan view of the door jamb structure of the present invention as taught herein.

Referring now to FIG. 7, composite wooden door jamb assembly 22 generally comprises a plurality of elongated wooden blocks 70 that are secured together to form a subframe door jamb 72. Subframe door jamb 72 can be secured within the framed door opening of the building to hold and secure door assembly 20 thereto. Subframe door jamb 72 defines a door jamb enclosure 74 therein. Composite door jamb assembly 22 further comprises an insulative foam door jamb core 76 which is placed within enclosure 74. Either solid or veneered wood components 78 of finish wood quality and grade are used on all surfaces that are observable during the use of the installed door jamb assembly 22. Consequently, where needed, a veneer or thin layer of solid wood 78 is placed over inexpensive and lower quality components which define the underlying subframe door jamb 72. A veneer 80 may also be used to cover screws 24 and/or the previously mentioned plugs.

The present invention further comprises a method for manufacturing door assembly 20. Such method comprises the steps of: (a) juxtaposing spacers 36 between the plurality of elongated members 34; (b) securing spacers 36 to elongated members 34 to form composite subframe assembly 26 that defines enclosure 32; (c) placing insulative foam core 28 within enclosure 32 between opposed stiles 38 and 38'' and opposed rails 40 and 40''; (d) securing insulative foam core 28 to subframe assembly 26; and (e) laminating exterior assembly 30 to subframe assembly 26 and to insulative foam core 28, exterior assembly 30 and subframe assembly 26 encapsulating insulative foam core 28 within enclosure 32.

The described method of manufacture may further comprise the step of securing ornamental molding 68 to exterior assembly 30.

Currently, a typical door manufactured using the processes of the present invention uses only twenty (20) board feet of wood material. In comparison, a door manufactured using traditional construction methods to create a solid wood paneled door will use an average of one hundred and twenty (120) board feet of wood material. The cost savings in material alone render the present invention far superior to the previously known methods of door construction.

It is estimated that using the present invention a crew of four persons could produce a door every six minutes. The present invention requires less capital investment, less supply stock to be purchased and stored, and less manufacturing space than previously thought necessary.

The specific structure as taught herein, using the described insulating foam core 28, significantly reduces heat loss through door assembly 20. For example, door assembly 20 of the present invention increases the insulating efficiency of the door by approximately two hundred percent (200%), from a standard 2.3 R factor to approximately a 5.0 R factor for a door as taught herein and a standard door jamb. The door and door jamb assemblies of the present invention can be designed to have an R factor ranging from about 3.0 to 10.0 or more.

The present invention also allows a door manufacturer to cost effectively produce individual "one size and kind" units as ordered.

In sharp contrast, old manufacturing methods and door structures required a large capital investment to obtain large manufacturing space and to purchase and store large quantities of supply stock. Such large investments were necessary since the cost of manufacture using old methods made it expedient to manufacture batches of one or more thousand doors.

The means and construction disclosed herein are by way of example and comprise primarily the preferred form of putting the invention into effect. Although the drawings depict the preferred embodiment of the invention, other embodiments have been described within the preceding text. One skilled in the art will appreciate that the disclosed device may have a wide variety of shapes and configurations. Additionally, persons skilled in the art to which the invention pertains might consider the foregoing teachings in making various modifications, other embodiments, and alternative forms of the invention.

It is, therefore, to be understood that the invention is not limited to the particular embodiments or specific features shown herein. To the contrary, the inventor claims the invention in all of its forms, including all alternatives, modifications, equivalents, and alternative embodiments which fall within the legitimate and valid scope of the appended claims, appropriately interpreted under the Doctrine of Equivalents.

INDUSTRIAL APPLICABILITY

The present invention may be used within the residential and commercial door construction industries, wherein simple, reliable, easily used apparatus and processes are needed to construct an energy efficient door and/or door jamb having a high-quality wood exterior. The door and door jamb assemblies created using this invention are easily constructed, energy efficient, durable, rugged, and inexpensive and economical to manufacture. Traditional or nontraditional means for attaching the door assembly to a home or office building may be used. The door assembly may be used in a conventional door frame or in a special door frame assembly using the features of this invention.

The present invention not only increases the energy efficiency of residential and commercial doors, it also significantly reduces the amount of expensive, high-quality wood that would otherwise be required.

What is claimed is:

1. A wooden door assembly for attachment to a framed door opening within a residential home or commercial building, said wooden door assembly comprising the combination of:
   (a) a composite wooden subframe stile and rail assembly defining an enclosure therebetween, said subframe assembly having a plurality of spaced, elongated members and a plurality of spacers secured thereto, said spacers being generally juxtaposed between said elongated members;
   (b) an insulative foam core secured to said subframe assembly between said elongated members; and
   (c) an exterior veneered or solid wood stile and rail assembly laminated to said subframe assembly and to said insulative foam core, said exterior assembly and said subframe assembly encapsulating said insulative foam core, said subframe assembly having at least a pair of subframe stiles, said subframe stiles each having at least two generally vertical elongated members, said elongated members being held in spaced relationship to each other by said spacers, said insulative foam core being positioned between said spaced elongated members.

2. The wooden door assembly of claim 1, wherein said exterior assembly further comprises one or more raised panels secured to said stile, rail, or insulative foam core.

3. The wooden door assembly of claim 1, wherein said spacers are secured to said elongated members by means of ultrasonic or radio frequency welding.

4. The wood door assembly of claim 1, wherein said subframe assembly comprises at least a pair of subframe rails, said subframe rails each having at least two generally horizontal elongated members, said elongated members being held in spaced relationship to each other by said spacers.

5. The wooden door assembly of claim 1, wherein at least two of said subframe stiles are generally identical and therefore interchangeable.

6. The wooden door assembly of claim 4, wherein said subframe rails define at least one kick or bottom rail assembly having at least two of said generally horizontal elongated members, said elongated members being held in spaced relationship to each other by said spacers, said bottom rail assembly being positioned near a lower edge of said wooden door assembly.

7. The wooden door assembly of claim 1, wherein said subframe rails are joined to said subframe stiles by means of a mortise and tenon joint.

8. The wooden door assembly of claim 1, wherein said subframe stiles further comprise at least one elongated member of finish wood material positioned about a portion of an outer periphery or edge portion of said wooden door assembly.

9. The wooden door assembly of claim 1, wherein said subframe rails further comprise at least one elongated member of finish wood material positioned about a portion of an outer periphery or edge portion of said wooden door assembly.

10. The wooden door assembly of claim 2, wherein an exterior surface of said exterior veneer or solid wood stile, rail, and raised panel assembly comprises finish wood material.

11. The wooden door assembly of claim 2, wherein said exterior veneer or solid wood rails further comprise a lap or tenon that engages adjacent said exterior veneer or solid wood stiles.

12. The wooden door assembly of claim 2, wherein said exterior veneer or solid wood stiles attach to adjacent said exterior veneer or solid wood rails with a scarf, lap, or mortise and tenon joint.

13. The wooden door assembly of claim 2, further comprising ornamental molding to secure said raised panel to said exterior veneer or solid wood stiles and rails.

14. The wooden door assembly of claim 2, wherein said insulative foam core comprises a base core and a spacer core, said spacer core being juxtaposed against and secured to said base core to raise a level of said insulative foam core to being generally flush with an exterior surface of said exterior veneer or solid wood stiles and rails, said veneer or solid wood panels being juxtaposed against and secured to said spacer core.

15. The wooden door assembly of claim 1, further comprising a wooden composite door jamb having a plurality of wooden blocks secured together to form a subframe door jamb that can be secured within the framed door opening and hold said wooden door assembly, said subframe door jamb defining a door jamb enclosure therein, said composite door jamb further comprising an insulative foam door jamb core within said door jamb enclosure, said composite door jamb further comprising an exterior veneer or solid wood laminate of finish wood material.

16. A wooden door assembly for attachment to a framed door opening within a residential home or commercial building, said wooden door assembly comprising the combination of:
  (a) a composite wooden subframe stile and rail assembly defining an enclosure therebetween, said subframe assembly having a plurality of spaced, elongated members and a plurality of spacers secured thereto, said spacers being generally juxtaposed between said elongated members;
  (b) an insulative foam core secured to said subframe assembly between said elongated members; and
  (c) an exterior veneered or solid wood stile and rail assembly laminated to said subframe assembly and to said insulative foam core, said exterior assembly and said subframe assembly encapsulating said insulative foam core, said subframe assembly having at least a pair of subframe stiles, said subframe stiles each having at least two generally vertical elongated members, said elongated members being held in spaced relationship to each other by said spacers, said subframe assembly having at least a pair of subframe rails, said subframe rails each having at least two generally horizontal elongated members, said elongated members being held in spaced relationship to each other by said spacers, at least two of said subframe rails being generally identical and therefore interchangeable.

17. The wooden door assembly of claim 16, wherein said exterior assembly further comprises one or more raised panels secured to said stile, rail, or insulative foam core.

18. The wooden door assembly of claim 16, wherein said spacers are secured to said elongated members by means of ultrasonic or radio frequency welding.

19. The wooden door assembly of claim 16, wherein at least two of said subframe stiles are generally identical and therefore interchangeable.

20. The wooden door assembly of claim 16, wherein said subframe rails define at least one kick or bottom rail assembly having at least two of said generally horizontal elongated members, said elongated members being held in spaced relationship to each other by said spacers, said bottom rail assembly being positioned near a lower edge of said wooden door assembly.

21. The wooden door assembly of claim 16, wherein said subframe rails are joined to said subframe stiles by means of a mortise and tenon joint.

22. The wooden door assembly of claim 16, wherein said subframe stiles further comprise at least one elongated member of finish wood material positioned about a portion of an outer periphery or edge portion of said wooden door assembly.

23. The wooden door assembly of claim 16, wherein said subframe rails further comprise at least one elongated member of finish wood material positioned about a portion of an outer periphery or edge portion of said wooden door assembly.

24. The wooden door assembly of claim 17, wherein an exterior surface of said exterior veneer or solid wood stile, rail, and raised panel assembly comprises finish wood material.

25. The wooden door assembly of claim 16, wherein said exterior veneer or solid wood rails further comprise a lap or tenon that engages adjacent said exterior veneer or solid wood stiles.

26. The wooden door assembly of claim 16, wherein said exterior veneer or solid wood stiles attach to adjacent said exterior veneer or solid wood rails with a scarf, lap, or mortise and tenon joint.

27. The wooden door assembly of claim 17, further comprising ornamental molding to secure said raised panel to said exterior veneer or solid wood stiles and rails.

28. The wooden door assembly of claim 17, wherein said insulative foam core comprises a base core and a spacer core, said spacer core being juxtaposed against and secured to said base core to raise a level of said insulative foam core to being generally flush with an exterior surface of said exterior veneer or solid wood stiles and rails, said veneer or solid wood panels being juxtaposed against and secured to said spacer core.

29. The wooden door assembly of claim 16, further comprising a wooden composite door jamb having a plurality of wooden blocks secured together to form a subframe door jamb that can be secured within the framed door opening and hold said wooden door assembly, said subframe door jamb defining a door jamb enclosure therein, said composite door jamb further comprising an insulative foam door jamb core within said door jamb enclosure, said composite door jamb further comprising an exterior veneer or solid wood laminate of finish wood material.

30. A wooden door assembly for attachment to a framed door opening within a residential home or commercial building, said wooden door assembly comprising the combination of:
  (a) a composite wooden subframe stile and rail assembly defining an enclosure therebetween, said subframe assembly having a plurality of spaced, elongated members and a plurality of spacers secured thereto, said spacers being generally juxtaposed between said elongated members;
  (b) an insulative foam core secured to said subframe assembly between said elongated members; and
  (c) an exterior veneered or solid wood stile and rail assembly laminated to said subframe assembly and to said insulative foam core, said exterior assembly and said subframe assembly encapsulating said insulative foam core, said subframe assembly having at least a pair of subframe stiles, said subframe stiles each having at least two generally vertical elongated members, said elongated members being held in spaced relationship to each other by said spacers, said subframe assembly having at least a pair of subframe rails, said subframe rails each having at least two generally horizontal elongated members, said elongated members being held in spaced relationship to each other by said spacers, said subframe rails defining at least one kick or bottom rail assembly having at least two of said generally horizontal elongated members, said elongated members being held in spaced relationship to each other by said spacers, said bottom rail assembly being positioned near a lower edge of said wooden door assembly, said insulative foam core being positioned between said spaced, elongated members of said kick or bottom rail assembly.

31. The wooden door assembly of claim 30, wherein said exterior assembly further comprises one or more raised panels secured to said stile, rail, or insulative foam core.

32. The wooden door assembly of claim 30, wherein said spacers are secured to said elongated members by means of ultrasonic or radio frequency welding.

33. The wooden door assembly of claim 30, wherein at least two of said subframe stiles are generally identical and therefore interchangeable.

34. The wooden door assembly of claim 30, wherein said subframe rails are joined to said subframe stiles by means of a mortise and tenon joint.

35. The wooden door assembly of claim 30, wherein said subframe stiles further comprise at least one elongated member of finish wood material positioned about a portion of an outer periphery or edge portion of said wooden door assembly.

36. The wooden door assembly of claim 30, wherein said subframe rails further comprise at least one elongated member of finish wood material positioned about a portion of an outer periphery or edge portion of said wooden door assembly.

37. The wooden door assembly of claim 31, wherein an exterior surface of said exterior veneer or solid wood stile, rail, and raised panel assembly comprises finish wood material.

38. The wooden door assembly of claim 30, wherein said exterior veneer or solid wood rails further comprise a lap or tenon that engages adjacent said exterior veneer or solid wood stiles.

39. The wooden door assembly of claim 30, wherein said exterior veneer or solid wood stiles attach to adjacent said exterior veneer or solid wood rails with a scarf, lap, or mortise and tenon joint.

40. The wooden door assembly of claim 31, further comprising ornamental molding to secure said raised panel to said exterior veneer or solid wood stiles and rails.

41. The wooden door assembly of claim 31, wherein said insulative foam core comprises a base core and a spacer core, said spacer core being juxtaposed against and secured to said base core to raise a level of said insulative foam core to being generally flush with an exterior surface of said exterior veneer or solid wood stiles and rails, said veneer or solid wood panels being juxtaposed against and secured to said spacer core.

42. The wooden door assembly of claim 30, further comprising a wooden composite door jamb having a plurality of wooden blocks secured together to form a subframe door jamb that can be secured within the framed door opening and hold said wooden door assembly, said subframe door jamb defining a door jamb enclosure therein, said composite door jamb further comprising an insulative foam door jamb core within said door jamb enclosure, said composite door jamb further comprising an exterior veneer or solid wood laminate of finish wood material.

* * * * *